Oct. 2, 1962 R. W. ECOFF 3,056,141
TANK BALL VALVE
Filed Sept. 13, 1961
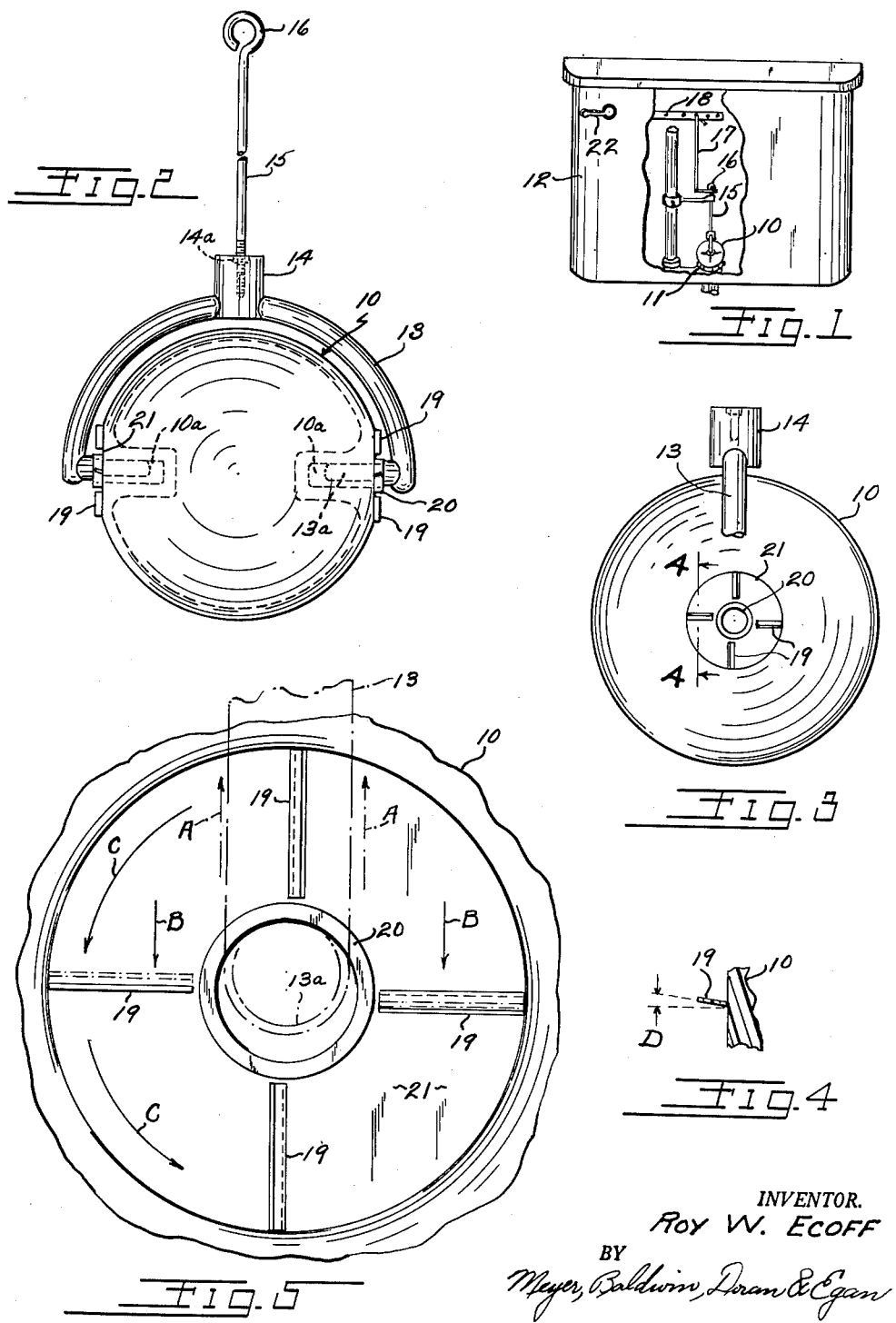
INVENTOR.
ROY W. ECOFF
BY
Meyer, Baldwin, Doran & Egan
ATTORNEYS

United States Patent Office 3,056,141
Patented Oct. 2, 1962

3,056,141
TANK BALL VALVE
Roy W. Ecoff, 3204 Sackett Ave., Cleveland 9, Ohio
Filed Sept. 13, 1961, Ser. No. 137,776
2 Claims. (Cl. 4—57)

This invention relates to improvements in a flush tank ball valve and more particularly to means associated with the ball valve to cause some rotative movement each time it seats itself under working conditions.

An object of the present invention is to provide a flush tank ball valve which is given at least a slight rotative movement by the turbulence of the water discharging from a flush tank each time the ball valve is lifted to open the valve seat.

Other objects and advantages of the invention will be apparent from the accompanying drawings and description and the essential features thereof will be set forth in the appended claims.

In the drawings—

FIG. 1 is a perspective view of a flush tank broken away to show the improved ball valve of this invention in its operative position;

FIG. 2 is an elevational view, enlarged, showing the ball valve with its supporting yoke;

FIG. 3 is an end elevational view of the ball valve of FIG. 2 with the supporting pin left out and with a portion of the near side of the yoke removed to more clearly show the construction;

FIG. 4 is a fragmental sectional view, enlarged, taken along the line 4—4 of FIG. 3; while FIG. 5 is an enlarged view of the central portion of FIG. 3 illustrating the action of the ball moving vanes during operation of the device.

As clearly shown in the drawings, my improved ball valve includes a generally spherical ball 10 adapted to seat, when in use, on a valve seat 11 of conforming shape located in the bottom of the flush tank 12 in the usual manner. The ball 10 is hollow and may be formed by any suitable material, preferably rubber or a synthetic resin material having suitable characteristics. While the present invention is not related to the specific manner of supporting the ball valve while in use, a preferred construction is shown in FIG. 2 wherein enclosed bosses 10a are provided integral with the spherical ball 10 to provide seats for trunnions 13a of a generally semi-circular yoke 13, the upper central portion of which is provided with a boss 14 which is adapted to have threaded into its central portion a vertically extending pin 15 having an eye 16 at its upper end by which the ball valve is lifted in the customary manner by means of an L-shaped link 17 attached to the flush tank lever 18 as is well known in the art. Preferably, a pilot hole 14a of slightly larger diameter than the pin 15 is provided so as to guide the pin 15 when it is threaded into the boss 14 to achieve a more accurate assembly. It should be understood that the walls of the ball valve and the bosses 10a provide a completely fluid-impervious shell so that the center of the ball is hollow and completely fluid-tight.

My invention contemplates the provision of a sufficient number of fins 19 extending generally radially outwardly from the opposite end walls of the ball valve 10 surrounding the support points where the trunnions 13a enter the ball. These fins 19 may be made integrally with the ball 10 or may be attached thereto and are of a relatively stiff, but slightly flexible, material such as rubber or a suitable synthetic resin material so that the fins remain outstanding from the ball but are adapted to change their angle of relationship relative to the ball as explained hereinafter in connection with FIGS. 4 and 5.

To keep the fins clear of the yoke 13, a suitable means is provided such as the collar 20 preferably formed integrally with the ball 10 and embracing the opening in the bosses 10a where the trunnions 13a enter. This collar is slightly higher in radial extent than the fins 19 so that the yoke 13 will not interfere with the action of the fins as hereinafter described. Preferably also, the ends of the ball are flattened as shown in FIG. 2 in the area where the fins and collar are attached, this area being approximately ¾ inch in diameter in the case of ball valve of 2½ inches of diameter.

As best seen in FIGS. 4 and 5, four of the vanes 19 are provided at approximately a 90 degree positioning, although more or less of such vanes could be provided so long as they cause the rotation of the ball hereinafter described. As shown in FIG. 5, the dot-dash arrows A indicate the vertical direction in which the yoke 13 and parts 15 and 17 are lifted when the handle 22 is operated to swing the lever 18 upwardly in a flushing operation. The full line arrows B in FIG. 5 indicate the downward flow of the water in the tank 12 on its way to pass out through the discharge valve seat 11 during a flushing operation when the tank ball has been lifted. It is an object of the present invention to utilize this flow of water in the direction of the arrows B to cause at least some rotation of the tank ball 10 so as to bring about a better seating in the valve seat 11 and also to provide a different seating area of the ball at each operation. This will cause a rotation in the direction of the arrows C of FIG. 5 in the manner about to be described.

The vanes 19 are so constructed that when in unstressed position they are inclined at a slight angle indicated at D in FIG. 4. In the form shown, this angle is approximately 10 degrees. Assume now that the two horizontally positioned vanes 19 in FIG. 5 are in the dot-dash position when the tank ball is lifted, then the water flowing in the direction of the arrows B will act upon the left-hand horizontal vane 19 to push it from the dot-dash position to the full line position where the vane will be approximately directly radially extending from the ball 10 rather than at the 10 degree inclined position shown in FIG. 4. At the same time, the right-hand horizontal vane 19 of FIG. 5 will be bent somewhat from the normal dot-dash position to the full line position thus increasing the 10 degree angle D to a greater inclined angle. This causes the area of vane 19 at the left in FIG. 5 to be greater in its vertical projection than the right-hand horizontal vane in FIG. 5 and, therefore, the action of the water in the direction of the arrow B will cause a greater force on the left-hand vane 19 than on the right-hand vane in FIG. 5, thus causing rotation of the ball in the direction of the arrows C.

What is claimed is:

1. In a valve generally of ball shape, means for supporting said ball for rotation about a substantially horizontal diametric axis, two sets of deformations on the external surface of said ball positioned generally radially with respect to said axis respectively on diametrically opposite sides of said ball, and the surfaces of one set of said deformations having greater reaction to fluid flow downwardly than the reaction of the other set, whereby fluid flow downwardly past said ball causes rotation of said ball about said axis in a predetermined direction.

2. A ball valve as defined in claim 1, wherein said deformations comprise vanes which are flat and provide planar surfaces extending generally normal to the surface of said ball but are inclined slightly opposite said direction of rotation about said axis, the connection of said vanes with said ball permitting limited vane deflection, and said deflection, when said vanes are subjected to downward fluid flow, causing a vane on one side of said axis to move toward a true radial position with greater effective area and causing a vane on the other side of said axis to incline at a flattened angle with less effective area.

References Cited in the file of this patent

UNITED STATES PATENTS

| | | |
|---|---|---|
| 1,739,185 | Stimson | Dec. 10, 1929 |
| 1,744,491 | Mullen | Jan. 21, 1930 |
| 2,788,525 | Reichert | Apr. 16, 1957 |
| 2,892,197 | Flieder | June 30, 1959 |